(12) United States Patent
Strubbe

(10) Patent No.: US 6,473,114 B1
(45) Date of Patent: Oct. 29, 2002

(54) METHOD AND SYSTEM FOR INDICATING CHANGE OF SPEAKER IN A VIDEOCONFERENCE APPLICATION

(75) Inventor: Hugo J. Strubbe, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/550,607

(22) Filed: Apr. 14, 2000

(51) Int. Cl.[7] .................................................. H04N 7/14
(52) U.S. Cl. ............................ 348/14.07; 348/14.09; 348/14.08; 345/753
(58) Field of Search ..................... 348/14.01, 14.02, 348/14.03, 14.04, 14.05, 14.07, 14.08, 14.09; 345/750, 751, 753, 781, 788; 709/204, 205; H04N 7/14

(56) References Cited

U.S. PATENT DOCUMENTS 5,675,374 A    10/1997   Kohda ........................ 348/15
5,953,050 A *  9/1999   Kamata et al. ........... 348/93.21
6,346,963 B1 * 2/2002   Katsumi .................... 348/14.09

FOREIGN PATENT DOCUMENTS

FR       2776457 A1    9/1999

* cited by examiner

Primary Examiner—Melur. Ramakrishnaiah

(57) ABSTRACT

A videoconferencing application suitable for large conferences with many terminals where displayed speakers are changed dynamically based on some schema employs animation effects to indicate the change. When a new speaker replaces an old, the new speaker's image is gradually transitioned into the place of the old speaker's by an animation that provides a clear cue and a visual metaphor for the event. A preferred embodiment translates the new image in and the old one out as if the new one were pushing the old image out of its place. Various other animations are also described which provide a similar result.

7 Claims, 6 Drawing Sheets

METHOD AND SYSTEM FOR INDICATING CHANGE OF SPEAKER IN A VIDEOCONFERENCE APPLICATION

FIELD OF THE INVENTION

The invention relates to communication systems employing at least two interconnected terminals supporting videoconferencing processes in which multiple parties communicate continuously and in which, at any given time, only one person is normally speaking. The invention further relates to such an environment where the terminals display images of at least one of the most recent speakers and which indicate a change in a most recent one of the speakers.

BACKGROUND OF THE INVENTION

Various multi-user communication systems, for example, groupware applications, distance learning systems, whiteboard applications, and videoconferencing systems permit a group, sometimes very large groups, to collaborate in real time. Distance learning systems are used for enabling students and teachers to attend and give lectures without the requirement of physically being in the same room or even the same building. Probably most widespread are videoconferencing systems. They allow people to have meetings without being restricted by the conference location. An example of such a conference system is described in U.S. Pat. No. 5,675,374, the entirety of which is incorporated by reference as if fully set forth herein. This system aims at establishing a videoconference which closely resembles a face-to-face conference held at a single location. The following invention may be used in this In such systems, each participant, or subgroup of participants, may have a terminal with a camera and at least one display. Communication can be oral or by typing, augmented by other mechanisms such as document scanning, handwriting recognition or direct image transfer, etc. One of the most important elements of such systems, however, is the visage of active participants.

To allow users to see each other, camera images are selectively displayed on each display. A typical display may show the field of view one or more cameras. If the conference includes many participants, the display of all the participants at all times becomes impossible so such systems select some subset of the participants based on criteria. One of the criteria typically used to identify the most worthy of the group to display is how recently the speaker has spoken. For example, the displays may show the last three speakers that spoke. When one of these has been dormant for a while, his/her image will be replaced by another who has spoken more recently.

The ongoing maintenance of the select group of participants results in sudden changes in the faces of the individual participants that spoke most recently. There are at least two problems. First, the sudden change from one face to another may not be very conspicuous so it might not be noticed. Second,.the transition can be abrupt and may therefore be disconcerting. An improved system for making the changes in the displayed subgroup more clear and natural is desirable.

SUMMARY OF THE INVENTION

Briefly, a typical display used in videoconferencing environment shows a subset of a larger group of participants, the subset being characterized by some selection criterion. For example, the three that have spoken the most up until the present moment may be maintained on the screen. Alternatively, the three that have spoken most recently may be maintained on the screen. Of course, the subset can be any practicable size and the number three is simply an example. When a change in the subset is required, one speaker is replaced by another in the following fashion. An animation is instantiated in which the image of the speaker that is to be replaced is scrolled off the screen and the new one is scrolled on as if pushing the old image off the screen. Various other alternative animations can be employed, the common theme of them being that there is a gradual transition and the transition is conspicuous.

To insure the animation is prominent and noticeable, a fade would not be ideal, even though such an effect is gradual and not terribly disconcerting. Another example of a suitable effect is a peel-away effect where the old image curls up from one edge to reveal the new image below it. Still another is a fade into the distance followed by a foreshortening effect or slide-in effect. The basic requirement is that the effect result in a gradual replacement of the image of the old speaker by a new speaker but in such a fashion as to be noticeable but visually agreeable.

A wide range of video animation effects can be produced using digital technology. These include shape changes such as gradually wrapping a planar image onto a cylinder or sphere, paper peel away effect, image breaking up into small bits and scattering, etc. Such effects are often used in football broadcasts. The idea in the invention is not to dazzle but to provide a visual cue and metaphor for the change of a member of group, like someone coming in a room and another leaving.

BRIEF DESCRIPTIONS OF THE DRAWING

Figure 6:
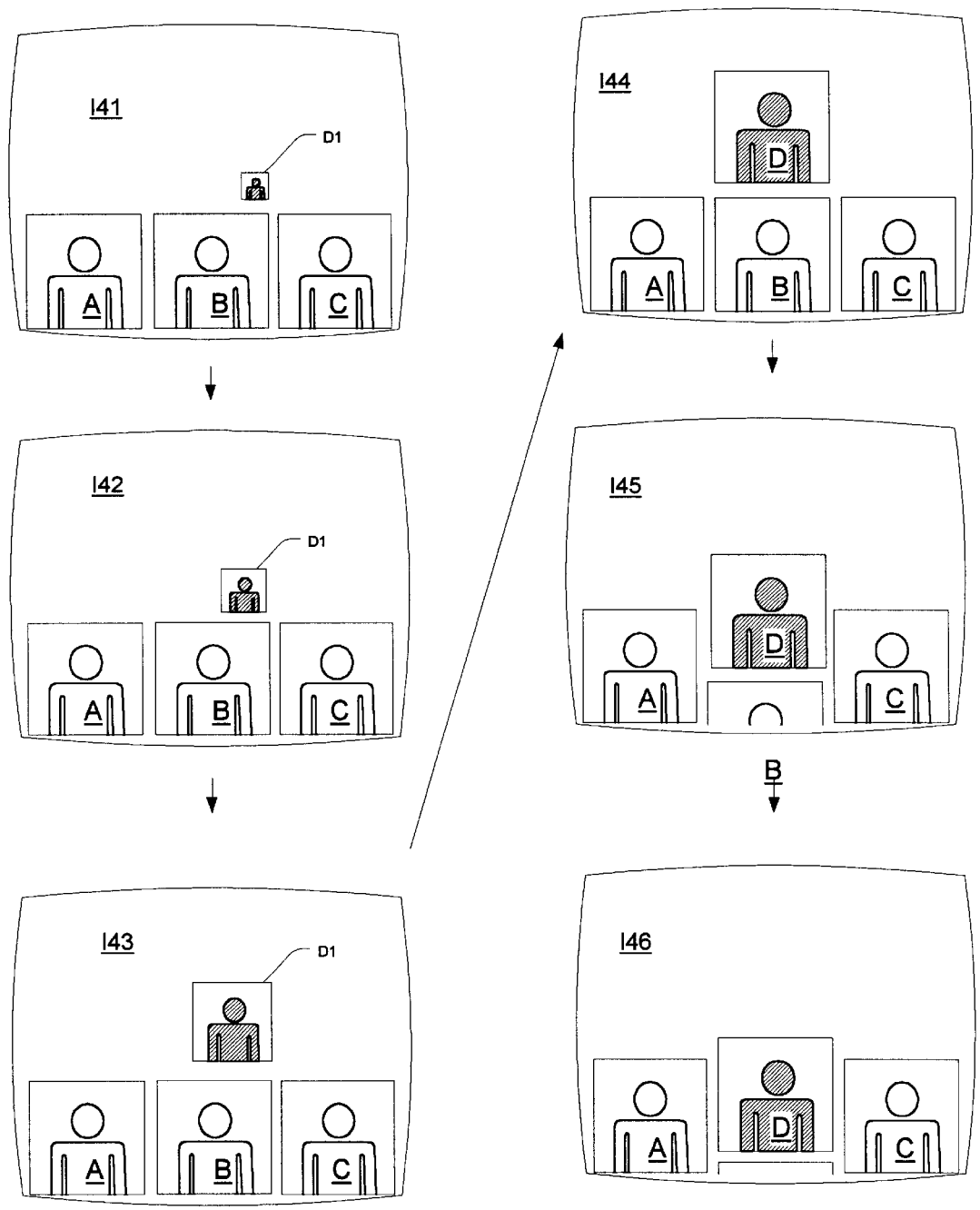

FIG. 6 is a figurative representation of a fifth participant-image changeover animation provided by yet another embodiment of the invention. This animation illustrates a candidate speaker appearing momentarily as he begins speaking. As the speech continues, the new image grows until, once the speech reaches a threshold duration, it starts to displace an old speaker.

DETAILED DESCRIPTION OF THE DRAWINGS

Figure 1:
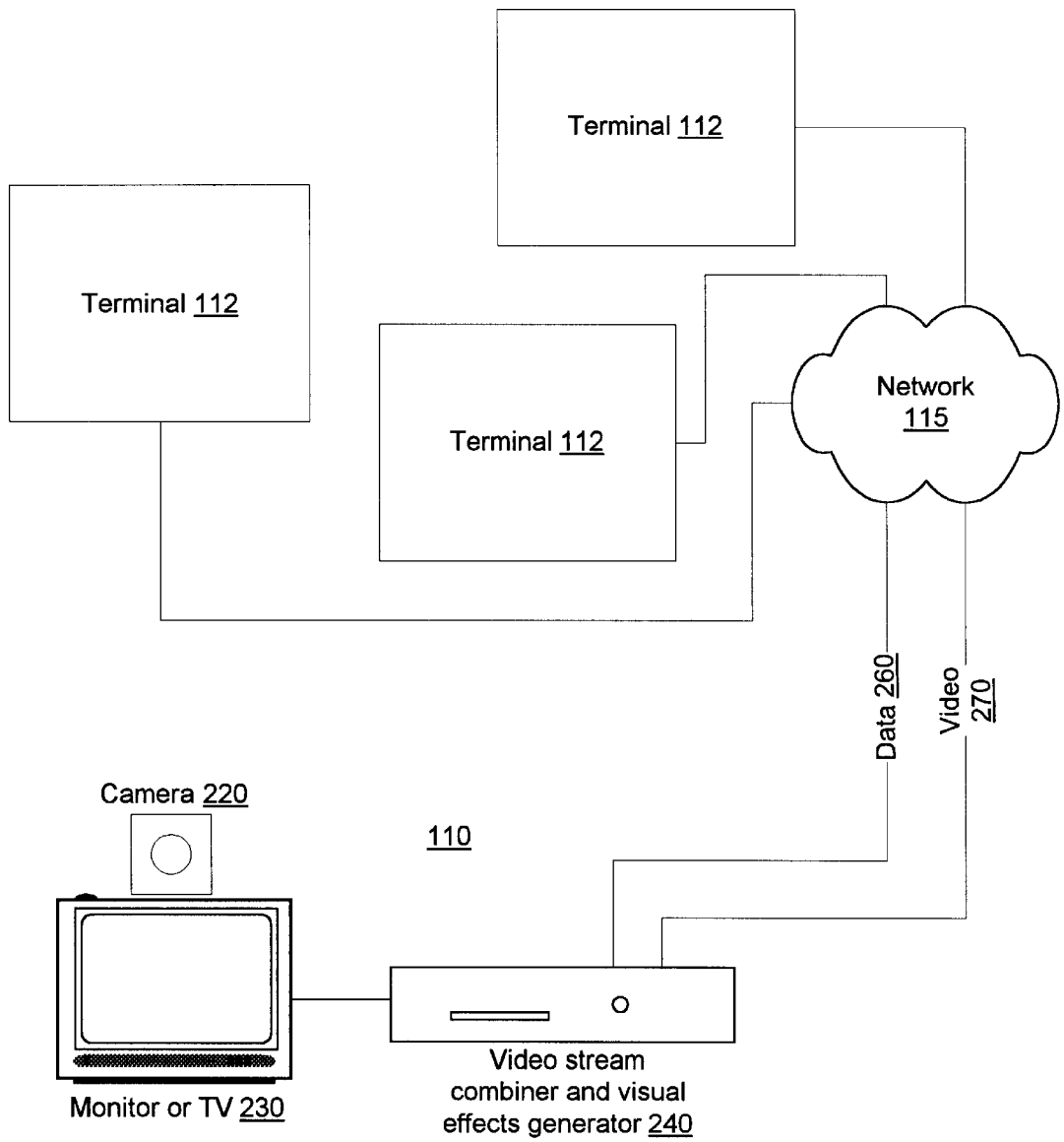
FIG. 1 is an illustration of hardware components that may be used to implement embodiments of the invention.

Referring now to FIG. 1 a videoconferencing system with several network terminals 110, 112 in communication over a network 115. Each terminal may have a television/monitor 230 receiving video output from a video stream combiner and visual effects generator 240. The latter receives video and/or data signals 260/270 from an Internet server, cable connection, switched connection, etc. A camera captures video from the location of the videoconferencing system. This video is shared with other like stations through a suitable network and gathered in the same way.

Figure 2:
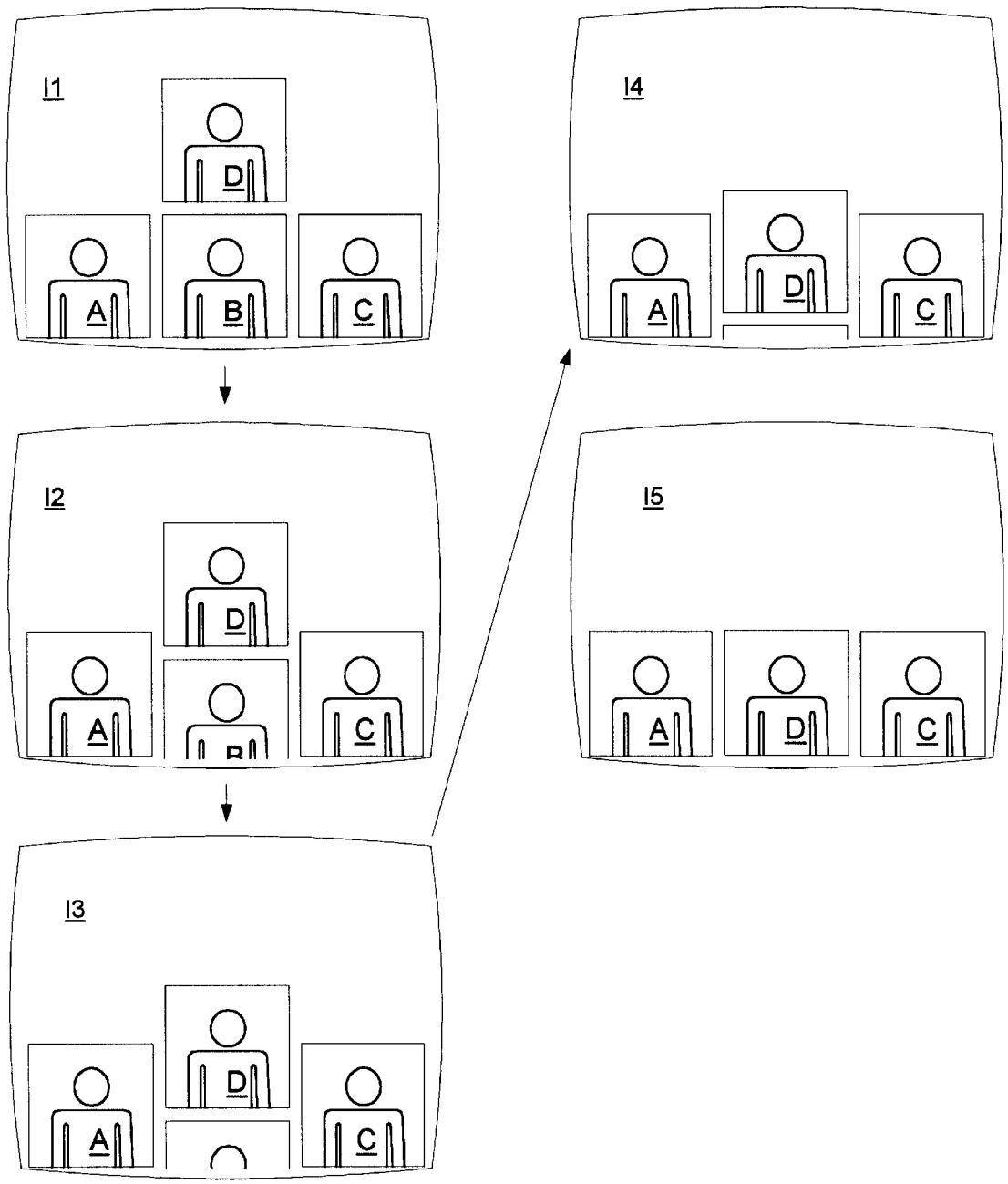
FIG. 2 is a figurative representation of a first participant-image changeover animation provided by an embodiment of the invention.

Referring to FIG. 2 a typical display used for applications where many participants are connected through groupware, or some similar software device, has a small number of images of participants A, D, and C as shown in frame I5. The images that are ordinarily shown are a subset of the participants that are selected according to some suitable schema such as frequency of participation, title, how recently the participant spoke, etc. Because such criteria may be dynamic, that is, they may change over time, the video image of one participant must be replaced with that of another on occasion. To make this transition clear, an animation sequence is employed which starts with frame I1.

In frame I1, a new speaker's image D has appeared on the screen. The new speaker's image D moves into the space as the old speaker's image B is moved out giving the appearance of being pushed out by the new speaker's image D. In an alternative embodiment, the new speaker's image D could move upwardly from the bottom and displace the old speaker's image B upwardly in a similar fashion with a similar effect. This animated transition provides a visual metaphor for the action that is taking place, analogous to a person leaving a group by moving out as another comes in.

The visual effect generation required to perform the above animation sequence provides no problem as this technology has been around for some time and is used with some frequency in the television broadcast area. However in this context, its purpose serves more than mere entertainment value. It is a cue that a change has taken place, the fact that it involves gradual transitions, such as image movement, rather than an abrupt changes, makes it more visually appealing, the particular effect is a meaningful and immediately universally recognizable visual metaphor for the change that has taken place. The change is that one person has left the group and another has come in. Such features are important elements of interaction design and serve to make a piece of equipment more user-friendly and informative.

Figure 3:
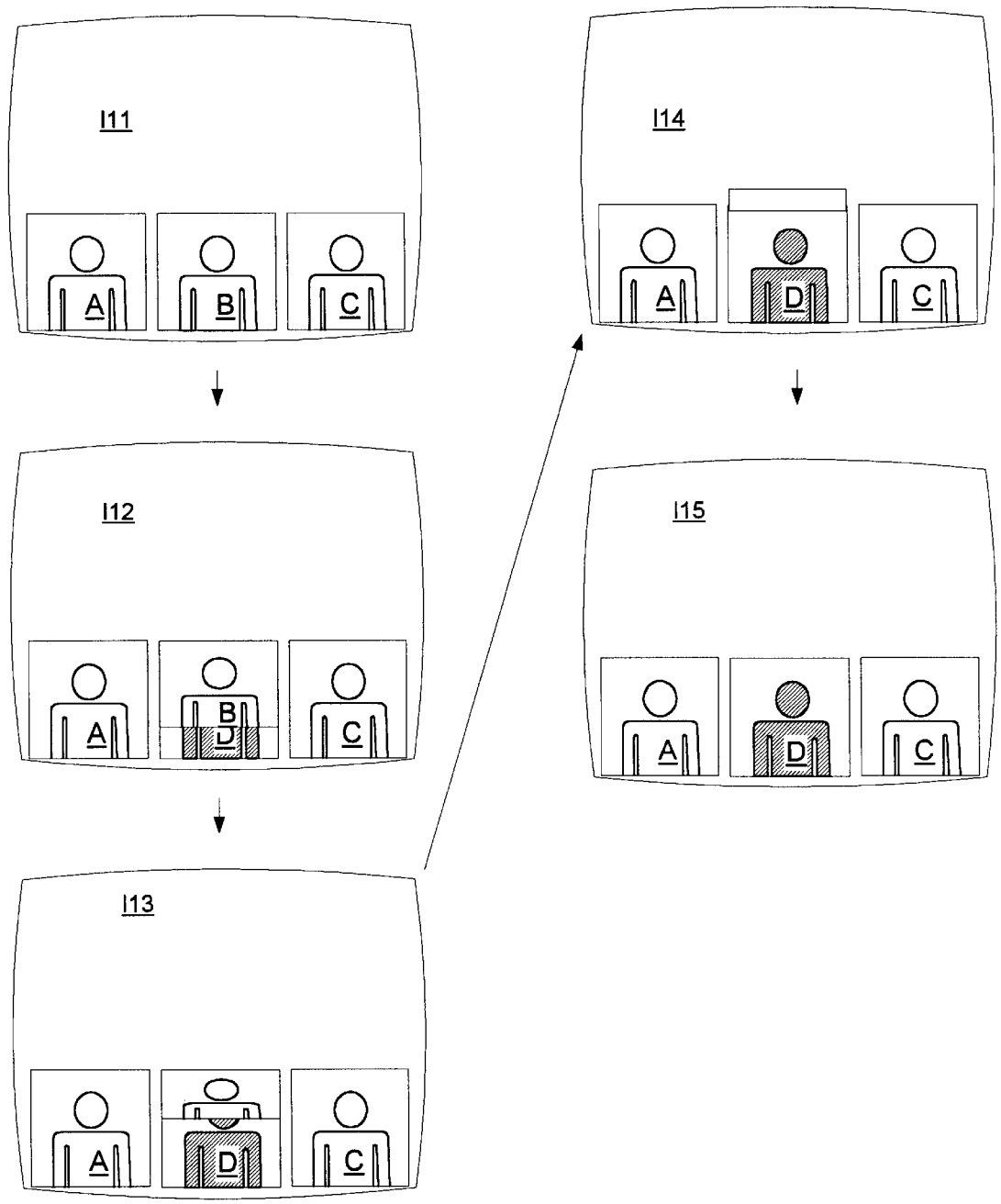
FIG. 3 is a figurative representation of a second participant-image changeover animation provided by another embodiment of the invention.

Referring to FIG. 3, another animation sequence that serves a similar purpose as the one shown in FIG. 2 begins with frame I11. In frame I11, the three speakers A, B, and C are shown prior to the changeover. In frame I12 speaker B's image begins to peel upward as a piece of paper being picked up from the bottom and peeled away. The transition continues through frames I13–I15 with the "top" image peeling away completely to reveal the image of speaker B.

Figure 4:
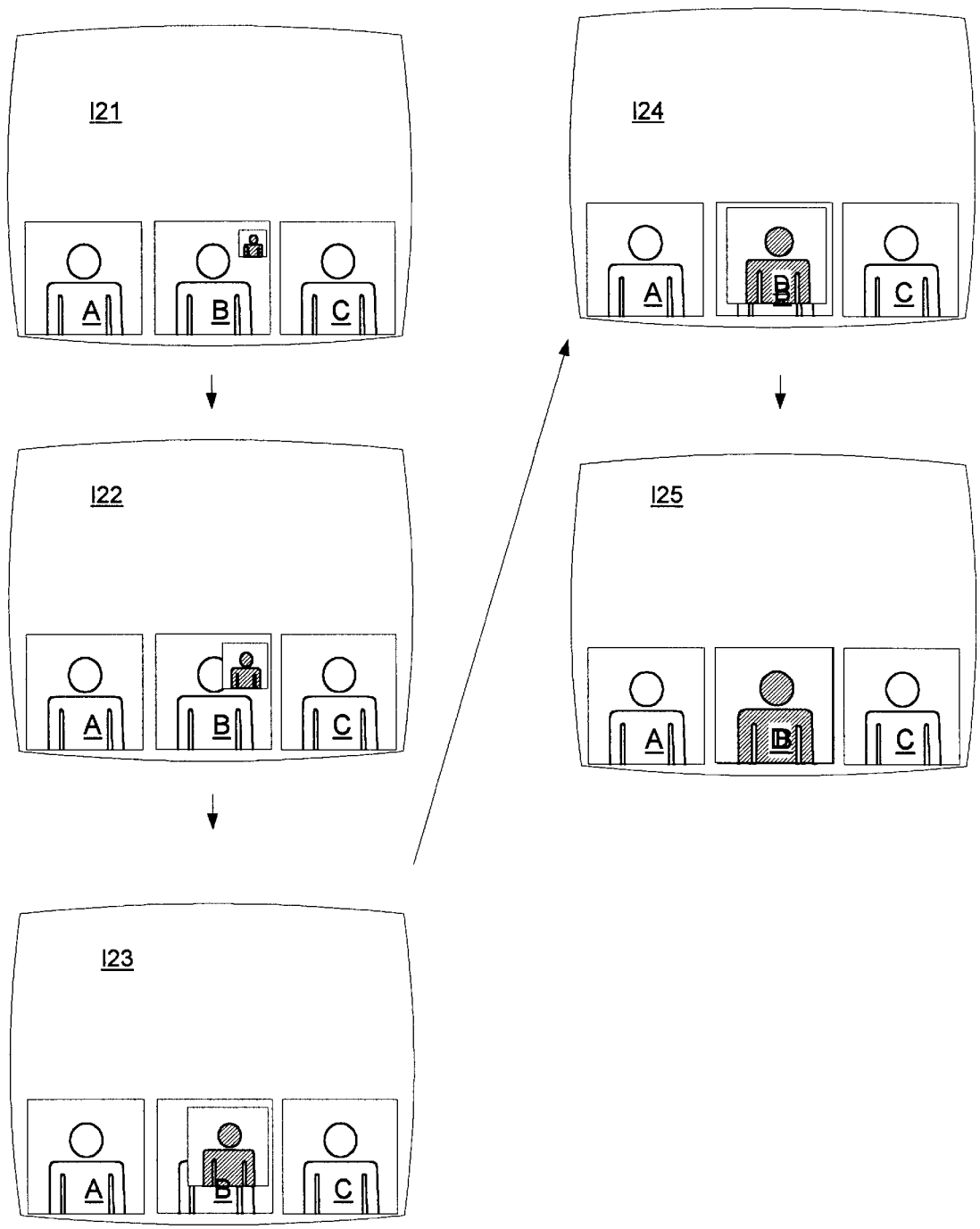
FIG. 4 is a figurative representation of a third participant-image changeover animation provided by yet another embodiment of the invention.

Referring to FIG. 4, yet another animation sequence that serves a similar purpose as the ones shown in FIGS. 2 and 3 begins with frame I21. In frame I21, the three speakers A, B, and C are shown just at the beginning of the animated changeover. In frame I21, the first step is shown with the image of the new speaker, speaker D, appearing small at first in a portion of the old speaker's image B. In frame I22 speaker D's image begins to grow. It continues to grow until it covers the old speaker's image B completely. The result is shown in frame I25.

Figure 5:
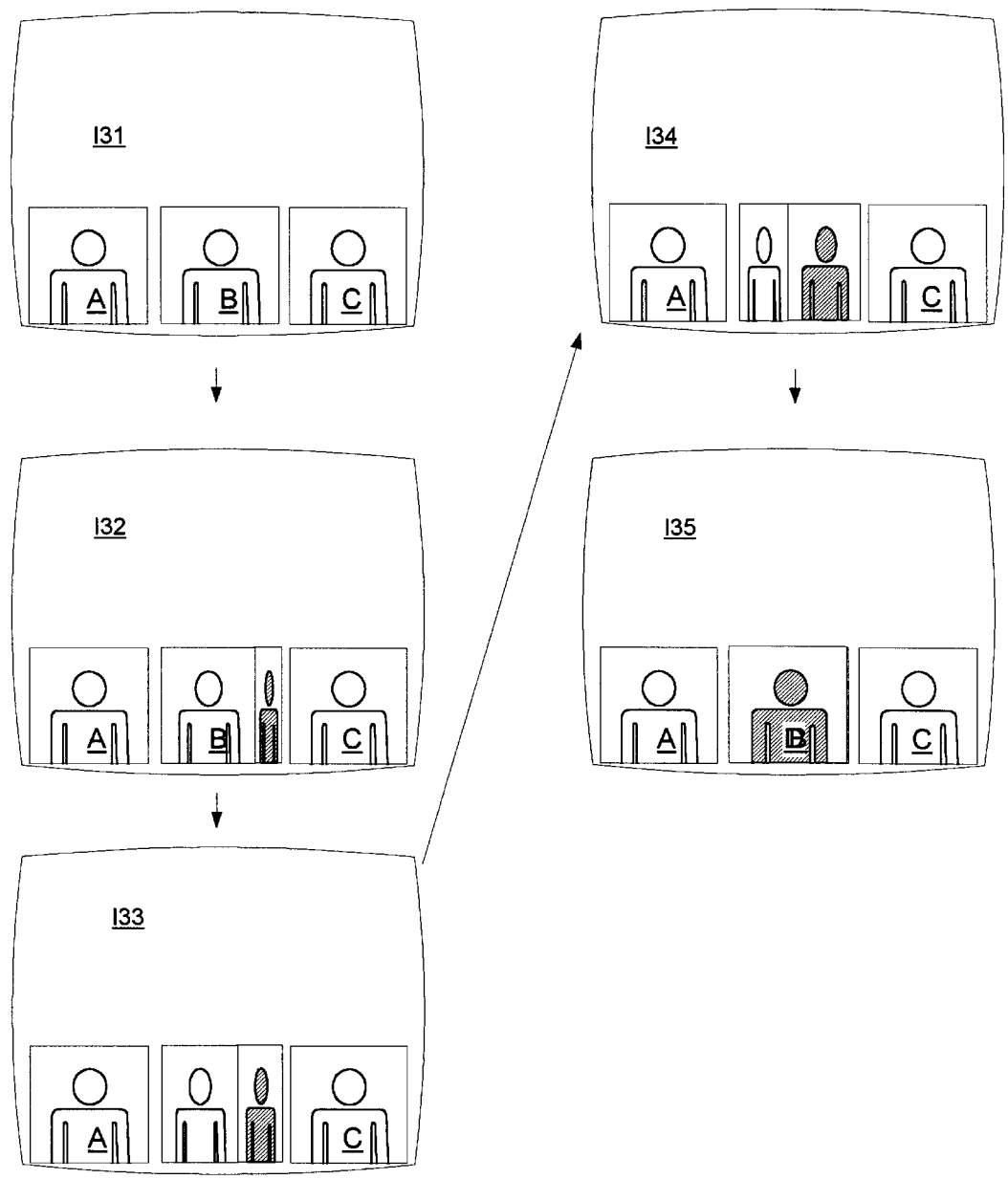
FIG. 5 is a figurative representation of a fourth participant-image changeover animation provided by yet another embodiment of the invention.

Referring to FIG. 5, another animation sequence that serves a similar purpose as the one shown in FIGS. 2, 3, and 4 begins with frame I31. In frame I31, the three speakers A, B, and C are shown prior to the changeover. In frame I32 speaker B's image begins to move toward the left and narrows, suggesting that it is on a rectangular cylinder (prism) that is rotating to the left. As the imaginary cylinder continues to rotate, the image of speaker D begins to roll into view in frames I32 and I33. The effect continues with frames I34 and I35 until the image of the new speaker, speaker D completely displaces that of the old speaker, speaker B.

Referring now to FIG. 6, a candidate speaker appears on the display at D1 when the candidate speaks momentarily as shown in frame I41. If the candidate speaker D1 continues to speak, the candidate continues to grow as shown in frame I42. If the candidate speaker D1 stops speaking, his/her image shrinks and disappears. If the candidate speaker continues speaking beyond a predefined interval, the candidate speaker image D1 grows to the size of the other speakers A, B, and C and the animation sequence of FIG. 2, beginning at frame I44 is performed. Thus, the candidate now pushes the old speaker B out of the frame as illustrated in frames I44–I46.

While the particular embodiment shown and described above has proven to be useful in determining the change in speaker for purposes of video conferencing, further modifications of the present invention herein disclosed will occur to persons skilled in the art to which the present invention pertains, and all such modifications are deemed to be within the scope and spirit of the present invention defined by the appended claims.

I claim:

1. A method of indicating a change of speaker in a videoconferencing system, comprising the steps of:
    displaying images of current conference participants;
    displaying an image of a new conference participant responsively to an indication of speech uttered by said new conference participant;
    removing said image of said new conference participant when said speech is of a first duration;
    replacing one of said images of said current conference participants with said image of said new conference participant when said speech is of a-duration longer than said first duration.

2. A method as in claim 1, wherein said step of replacing includes one of displacing and contracting said image of said one of said current conference participants.

3. A method as in claim 2, wherein said step of replacing includes dilating said image of said new conference participant.

4. A method as in claim 3, wherein said step of removing includes contracting said image of said new conference participant.

5. A method as in claim 1, wherein said step of replacing includes dilating said image of said new conference participant.

6. A method as in claim 5, wherein said step of removing includes contracting said image of said new conference participant.

7. A method as in claim 1, wherein said step of removing includes contracting said image of said new conference participant.

* * * * *